United States Patent
Eggertson (10) Patent No.: US 10,788,023 B2
(45) Date of Patent: Sep. 29, 2020

(54) PASSIVE ACTUATOR FOR SUPPRESSING A VIBRATION OF A COLUMN PIPE OF A VERTICAL PUMP, VERTICAL PUMP AND METHOD OF RETROFITTING A VERTICAL PUMP

(71) Applicant: Sulzer Management AG, Winterthur (CH)

(72) Inventor: Edward Curran Eggertson, Effretikon (CH)

(73) Assignee: SULZER MANAGEMENT AG, Winterthur (CH)

( * ) Notice: Subject to any disclaimer, the term of this patent is extended or adjusted under 35 U.S.C. 154(b) by 0 days.

(21) Appl. No.: 16/463,064

(22) PCT Filed: Nov. 28, 2017

(86) PCT No.: PCT/EP2017/080707
§ 371 (c)(1),
(2) Date: May 22, 2019

(87) PCT Pub. No.: WO2018/114247
PCT Pub. Date: Jun. 28, 2018

(65) Prior Publication Data
US 2019/0277267 A1    Sep. 12, 2019

(30) Foreign Application Priority Data
Dec. 20, 2016   (EP) .................................... 16205390

(51) Int. Cl.
*F03G 7/06*   (2006.01)
*F04D 29/66*  (2006.01)

(52) U.S. Cl.
CPC ........... *F03G 7/065* (2013.01); *F04D 29/668* (2013.01); *F04D 29/669* (2013.01)

(58) Field of Classification Search
CPC ........ F03G 7/065; F04D 13/08; F04D 29/043; F04D 29/668; F04D 29/669; F16F 7/104; F16L 55/041
See application file for complete search history.

(56) References Cited

U.S. PATENT DOCUMENTS 9,182,001 B2 * 11/2015 Pesek ...................... F04D 13/08
2009/0180874 A1 *  7/2009 Gutierrez .............. F04D 29/606
                                                           415/219.1

(Continued)

FOREIGN PATENT DOCUMENTS

EP    2431631 A1    3/2012
EP    2960518 A1    12/2015

(Continued)

OTHER PUBLICATIONS

International Search Report and Written Opinion dated Jan. 25, 2018 in corresponding International Application No. PCT/EP2017/080707, filed Nov. 28, 2017.

*Primary Examiner* — Shafiq Mian
(74) *Attorney, Agent, or Firm* — Global IP Counselors, LLP (57) ABSTRACT

A passive actuator for suppressing vibration of a column pipe of a vertical pump, the actuator being mounted between the column pipe of the vertical pump and a canister surrounding the column pipe. The passive actuator includes a first operational state for adding stiffness between the canister and the column pipe and a second operational state for at least reducing the stiffness. The passive actuator includes passive actuator elements, each of which automatically changes from the second operational state to the first operational state when the temperature of the passive actuator element changes from a second to a first temperature, the first temperature being different from the second temperature, and to automatically change from the first operational (Continued)

state to the second operational state, when the temperature of the passive actuator element changes from the first temperature to the second temperature.

17 Claims, 5 Drawing Sheets

(56) References Cited

U.S. PATENT DOCUMENTS

2012/0213632 A1\* 8/2012 Parry ................... F04D 13/08
  415/208.1
2015/0211550 A1\* 7/2015 Behnke ................ F04D 29/528
  415/112

FOREIGN PATENT DOCUMENTS

EP      3059448 A1  8/2016
JP    2002005097 A  1/2002

\* cited by examiner

PASSIVE ACTUATOR FOR SUPPRESSING A VIBRATION OF A COLUMN PIPE OF A VERTICAL PUMP, VERTICAL PUMP AND METHOD OF RETROFITTING A VERTICAL PUMP

CROSS-REFERENCE TO RELATED APPLICATION

This application is a U.S. National Stage application of International Application No. PCT/EP2017/080707, filed Nov. 28, 2017, which claims priority to European Patent Application No. 16205390.4, filed Dec. 20, 2016, the contents of each of which are hereby incorporated herein by reference.

BACKGROUND

Field of the Invention

The invention relates to a passive actuator for suppressing vibration of a column pipe of a vertical pump as well as to a vertical pump. The invention further relates to a method of retrofitting a vertical pump.

Background of the Invention

Vertical pumps have been used successfully in a plurality of applications for a very long time. Vertical pumps for specific applications are quite often designed and manufactured in accordance with the specifications of the users or are matched in detail to specific requirements. A vertical pump is installed to operate in the vertical direction and comprises a column inlet for a fluid at the lower end of the pump, a pump outlet for the fluid at the upper end of the pump and a column pipe arranged between the column inlet and the pump outlet. The fluid to be pumped enters the pump at the suction side through the column inlet and flows through the column pipe to the pump outlet at the discharge side. Vertical pumps may be designed both as single stage and multistage pumps. They are typically immersed into the fluid to be pumped, so that at least the intake or suction bell at the column inlet with the adjoining pump rotor is immersed into the fluid so that the pump is directly ready for operation.

One typical field for the use of a vertical pump is in pumping systems where the available net positive suction head (NPSHA, the subscript 'A' standing for 'available') is limited for example due to system constraints or liquids operating near their vapor pressure.

For such an application, the vertical pump either comprises or is arranged in a concentric canister surrounding the column pipe. The fluid to be pumped enters the canister essentially at the level of the pump outlet, so that the difference in height between the column inlet and the pump outlet increases the suction pressure at the column inlet therewith increasing the available NPSH at the impeller. This is one of the reasons why a vertical pump has to be designed with a large flexibility regarding the length of the column pipe, so that the pump may be matched to the specific conditions and NPSH requirements at the operation site.

Typical applications of this type comprise liquid petroleum gas (LPG) boosting, tank farm and pipeline boosting, conveying of liquefied natural gas (LNG) or ethene, use in cryogenic gas plants, use in heat exchange circuits using evaporation and condensation of a fluid, or other applications in the oil and gas industry, for example in the refining process.

In addition to such processes where cryogenic fluids like LNG have to be pumped, vertical pumps are also used for conveying very hot fluids, for example in the energy generation with solar energy systems, especially with concentrated solar power (CSP) systems, where the sunlight heats a heat transfer fluid (HTF). Nowadays, one of the preferred heat transfer or heat storage fluids is molten salt. The molten salt that has to be pumped by the vertical pump has for example a temperature of up to 350° C. on the cold side of the process and up to 600° C. on the hot side of the process.

One typical and well-known setup of a vertical pump (see for example FIG. 1) comprises a pumping unit with an inlet at the base and at least one impeller located near the inlet (impeller not shown in FIG. 1) for conveying the fluid. The pumping unit is connected by a vertically upwards extending column pipe to a discharge unit having an outlet for the fluid. On top of the discharge unit a drive unit is provided for driving the impeller. The drive unit is operatively connected to the impellers by a line shaft extending through the length of the column pipe. Usually the vertical pump is supported by a foundation being arranged beneath and in the proximity of the pump outlet, such that the pumping unit and the main part of the column pipe are freely hanging without further support.

SUMMARY

One of the problems with vertical pumps is the vibration of the column pipe that can be caused, for example, by unbalance or misalignment of rotating parts and exacerbated by structural natural frequencies of the pump installation. In former times, vertical pumps were mostly designed by rule of thumb. Due to a lack of reliable analytical methods many of these pumps were designed with structural natural frequencies at or near the running speed of the pump or multiples thereof. For example, when the pump is running at 1800 rpm this corresponds to a frequency of 30 Hertz. If 30 Hertz is near a structural natural frequency of the system the pump is running at a speed corresponding to a structural natural frequency of the pump system, a phenomenon called resonance, thus exacerbating vibrations. When such a matching occurs, a considerable load results, especially on the bearings, which causes for example a premature failure of the bearings or the line shaft. In addition, enhanced wear or other negative degradation effects may occur.

Nowadays it is state of the art that vertical pumps are subject to a computational modal analysis or numerical simulations before manufacturing to avoid mechanical resonance effects causing strong vibrations especially of the column pipe. However, very small modifications in the pump characteristics, which are for example caused by parameters that are not known with a sufficient accuracy, can have large, unforeseen effects on the natural frequencies (eigenfrequencies) of the pump installation resulting in resonance vibrations at frequencies where none were predicted during the analysis. As an example, one of the parameters which is quite often not or not sufficiently known during the analysis is the stiffness of the foundation supporting the pump at the operation site. This parameter is very difficult to quantify. Another example is the design of the stool or the stand for the motor driving the pump. Sometimes even the natural frequencies of the motor itself are not sufficiently known.

Thus, there is quite often a need to solve vibration problems on the operation site of the vertical pump. One simple solution is to fix the column of the vertical pump to the canister at appropriate locations between the suction side and the discharge side in order to stiffen the column pipe and to shift the natural frequencies and avoid resonance. However, for nearly all applications this solution cannot be used because it is a requirement that the vertical pump with the column pipe must be easily removable from the canister, for example to perform service, maintenance or repair work. Therefore the column pipe cannot be fixed to the canister except at the foundation supporting the pump.

Another solution that has been successfully used for solving vibration problems in a vertical pump is providing passive dynamic absorbers (PDA) that are mounted to the drive unit, for example the motor, that drives the pump. Still another known solution is the tuning of the stiffness of the foundation supporting the pump. By this measure the natural frequencies of the pump installation may be shifted away from the running speed of the pump. This tuning may be achieved by adding a resilient layer at the foundation.

However, both solutions, the PDAs and the resilient layers, have only a very narrow range of effectiveness for suppressing or damping the vibration of the column pipe. Already small changes to the pump configuration or the pump operation may have the result that the PDAs or the resilient layers completely lose their ability to dampen or to suppress the vibration. In addition, such solutions are only suited for pumps running at a fixed speed. Furthermore, PDAs are a highly engineered solution requiring a high level of expert know-how for the design, the installation and the maintenance which renders this solution quite expensive. The resilient layer is a solution that usually may not be easily designed before installation but has to be tested iteratively in a trial and error procedure.

Therefore it is an object of the invention to propose a device for suppressing a vibration of a column pipe of a vertical pump in such an effective manner that the described resonance effects may be avoided. The device should be easily installable and easily adaptable to the specific application. In addition, the device shall allow an easy removal of the vertical pump from the canister. Furthermore, the device shall be suited for retrofitting existing vertical pumps in a simple and cost-efficient manner. In addition, it is an object of the invention to propose a vertical pump that allows for suppressing of vibration of its column shaft in a simple and cost-efficient manner. Furthermore, it is an object of the invention to propose a method of retrofitting an existing vertical pump which method allows for suppressing vibration of the column pipe.

The subject matter of the invention satisfying these objects is characterized by the features described herein.

Thus, according to the invention, a passive actuator is proposed for suppressing vibration of a column of a vertical pump, wherein the actuator is adapted to be mounted between the column pipe of the vertical pump and a canister surrounding the column pipe, the passive actuator having a first operational state for adding stiffness between the canister and the column pipe and a second operational state for at least reducing the stiffness, wherein the passive actuator comprises a plurality of passive actuator elements, each of which is designed to automatically change from the second operational state to the first operational state when the temperature of the passive actuator element changes from a second temperature to a first temperature, the first temperature being different from the second temperature, and to automatically change from the first operational state to the second operational state, when the temperature of the passive actuator element changes from the first temperature to the second temperature.

When mounted to a vertical pump the passive actuator is arranged between the column pipe of the vertical pump and the canister surrounding the column pipe at a location between the column inlet and the pump outlet. Preferably, the passive actuator is fixed to the column pipe. When the vertical pump is in operation, the passive actuator is in the first operational state and introduces a stiffness between the canister and the column pipe, possibly accompanied by a bracing force. In this first operational state each passive actuator element strongly engages the inside of the canister thus forming a stiff connection between the canister and the column pipe. This stiff connection between the canister and the column pipe results in a bracing force for suppressing vibration. The column pipe is clamped by the passive actuator elements that are on their other side supported by the canister.

The appropriate height between the column inlet and the pump outlet at which the passive actuator is placed is preferably determined in dependence on the specific natural frequency or the target mode that shall be addressed. It is preferred to arrange the passive actuator at or near the antinode of the target mode. Of course, a plurality of actuators can be added at different heights along the length of the column pipe in order to add more stiffness and focus on multiple target modes.

In the second operational state, the stiffness and bracing force is at least considerably reduced (as compared to the first operational state) by releasing the bracing or clamping action of the passive actuator elements. The passive actuator elements no longer constitute a stiff connection between the canister and the column pipe. Depending on the specific embodiment it is also possible that the passive actuator elements completely lose contact with the canister. Usually, the passive actuator is in its second operational state when the pump is not in operation, i.e. when the pump is not running. Since the additional stiffness added by the passive actuator in its first operational state is released in the second operational state the vertical pump can be easily removed from the canister, for example to perform maintenance work.

The transition of the passive actuator elements from the first to the second operational state and vice versa is triggered by temperature, preferably the temperature of the process fluid. At a first temperature the passive actuator elements are in the first operational state and at a second temperature which is different from the first temperature the passive actuator elements are in the second operational state. Upon a change from the first temperature to the second temperature the passive actuator elements automatically (passively) change from the first to the second operational state. And likewise, upon a change from the second temperature to the first temperature the passive actuator elements automatically (passively) change from the second to the first operational state.

Therefore the passive actuator is particularly suited for such applications where the vertical pump conveys a cold fluid, such as LNG or a hot fluid, such as molten salt. When the vertical pump is not in operation the passive actuator elements arranged between the column pipe and the canister have the second temperature, for example ambient temperature. Accordingly the passive actuator is in its second operational state. During operation of the vertical pump the canister and the column pipe are filled with the cold or the hot fluid that has to be pumped, so that the passive actuator elements are in thermal contact with the fluid. Thus, the fluid to be pumped cools or heats the actuator elements. Consequently, during operation of the pump the passive actuator automatically changes into the first operational state and adds stiffness between the canister and the column pipe which suppresses the vibration. When the pump is switched off, the passive actuator is no longer cooled or heated by the fluid and its temperature reaches the second temperature where the passive actuator is in its second operational state.

The passive actuator according to the invention enables very efficient suppressing of vibration of the column pipe. In addition, the passive actuator is very easy to install and very flexible with respect to its application, because it can be arranged at any appropriate location (height) between the column pipe and the canister and its position can be easily changed. In particular, the passive actuator can be easily mounted and its position can be easily changed at the operation site where the pump is installed and therefore the passive actuator is also particularly suited for trouble-shooting already installed vertical pumps.

It is also possible to arrange two or more passive actuators at the same column pipe, for example to suppress vibrations that are caused by different natural frequencies of the pump installation. Thereby it is possible to eliminate or at least to increase all modes that are within, at or near the operational speed(s) of the vertical pump to above the maximum operating speed of the pump.

Preferably, all passive actuator elements are fixed to a holding device, which is configured to be mounted around the column pipe of the vertical pump. The holding device may be designed as a ring shaped band, for example a metal band or a metal band divided into two semicircular pieces, with a hinge and a closing means, so that the holding device with the actuator elements mounted to it can be fixed to the column pipe in a very simple manner. Alternatively it is also possible to fix the holding device and/or the passive actuator elements to the canister. For constructional reasons it is however preferred to fix the holding device and/or the passive actuator elements to the column pipe.

According to a preferred measure each passive actuator element has a radial dimension in a radial direction, the radial direction extending perpendicular to an axial direction in the mounted state of the actuator, the axial direction being defined by the rotational axis of the vertical pump, and said radial dimension is different in the first operational state and in the second operational state. In such embodiments the temperature change from the second to the first temperature causes an expansion of the passive actuator element in the radial direction. In the first operational state the passive actuator element has a larger dimension in the radial direction and constitutes a stiff or rigid connection between the canister and the column pipe. The column pipe is clamped by the passive actuator elements extending between the column pipe and the canister and firmly engaging both the column pipe and the canister. In the second operational state each passive actuator element has a smaller dimension in the radial direction so that the added stiffness on the column pipe is at least considerably reduced. It is also possible that one or more of the passive actuator elements loses or lose completely contact with the canister.

According to a first preferred embodiment each passive actuator element comprises a liquid-tight chamber extendible in the radial direction, wherein the chamber is filled with a medium, preferably water or a water containing mixture, wherein the medium is liquid in the second operational state and solid in the first operational state. This first embodiment is particularly suited for low temperature applications, i.e. applications where the fluid to be pumped is very cold and has a temperature considerably below 0° C. These applications comprise for example the pumping of cryogenic fluids like LNG, that may have temperatures in the range of −160° C. Therefore, the first temperature is considerably below 0° C. and causes the water or the water containing mixture in the chamber to freeze. Upon freezing the volume of the water or the water containing mixture increases which in turn increases the radial dimension of the passive actuator element. The second temperature, which is usually equal to ambient temperature, is above 0° C. When the passive actuator is in its first operational state the medium in the chamber is in the solid state. The increase of the temperature from the first temperature to the second temperature caused by switching off the vertical pump results in a phase transition of the medium into the liquid state and therewith reduces the radial dimension of the passive actuator element.

The chamber may be delimited by a flexible wall designed to allow for an expansion of the chamber with respect to the radial direction.

To realize the flexibility of the wall it is preferred when the flexible wall is at least partially made of a polymer.

According to another preferred design of the first embodiment the chamber is delimited by a housing and by a movable wall, the wall being movable relative to the housing in the radial direction. Upon expansion of the medium in the chamber the wall is moved in radial direction thus increasing the radial dimension of the passive actuator element.

Particularly preferred the movable wall is designed as a piston being guided by the housing.

According to a second preferred embodiment, the temperature induced change of the radial extension of the passive actuator element is realized without the use of a liquid. In the second embodiment each passive actuator element comprises a metallic expander, which is designed and arranged such that the radial dimension of the passive actuator element is different in the first operational state and in the second operational state. The metallic expander undergoes a reversible deformation due to a temperature change. This metallic expander may be realized by means of a bimetallic element, for example by a bimetallic strip or plate, or by means of a shape memory alloy (SMA) having its phase transition temperature from the high to the low temperature phase at a temperature between the first and the second temperature.

According to a third preferred embodiment each passive actuator element has a radial dimension in a radial direction, the radial direction extending perpendicular to an axial direction in the mounted state of the actuator, the axial direction being defined by the rotational axis of the vertical pump, wherein the passive actuator element has a high stiffness with respect to the radial direction in the first operational state, the high stiffness preventing a compression of the passive actuator element with respect to the radial direction, and wherein the passive actuator element has a low stiffness with respect to the radial direction in the second operational state, the low stiffness allowing an elastic compression of the passive actuator element with respect to the radial direction.

In the third embodiment the temperature change between the first and the second temperature causes a change in the stiffness of the passive actuator element. In the second operational state the passive actuator element is quite soft with respect to the radial direction, i.e. it can be easily compressed in the radial direction by only applying a small force. This property renders it possible for the vertical pump to be easily removed from the canister when the passive actuator is in its second operational state. In its first operational state the passive actuator element is considerably stiffer with respect to the radial direction and it cannot be compressed any longer in the radial direction by such small forces as in the second operational state. In the first operational state each passive actuator element constitutes a stiff connection between the column pipe and the canister. Thus, the column pipe is radially constrained by the passive actuator(s).

The terms "high stiffness" with respect to the first operational state and "low stiffness" with respect to the second operational state shall mean that the stiffness of the passive actuator element with respect to the radial direction is remarkably different in these two operational states. Whereas the passive actuator element is soft, i.e. easily compressible, with respect to the radial direction in the second operational state, so that the vertical pump is easily removable from the canister, the passive actuator element is stiff, i.e. essentially not compressible, with respect to the radial direction in the first operational state, so that the passive actuator element adds stiffness between the column pipe and the canister for suppressing vibrations of the column pipe or shifting the natural frequencies, respectively. The concrete absolute values of the stiffness in the first and the second operational states are not important.

Preferably the third embodiment is designed such that each passive actuator element comprises a housing and a movable wall, the wall being movable relative to the housing in the radial direction, wherein the housing and the wall are made of different materials, having different coefficients of thermal expansion, such that the housing clamps the wall in the first operational state, and that the wall is movable relative to the housing in the second operational state. When the housing clamps around the wall in the first operational state, it hinders a relative movement between the wall and the housing in radial direction. In the second operational state said clamping is released such that the wall is easily movable in radial direction relative to the housing.

Depending on whether the fluid to be pumped is very hot or very cold, either the housing or the movable wall is made of a material that has a very low or even negligible coefficient of thermal expansion (for example an Invar alloy) and the other one of the housing and the wall is made of a material having a considerably higher coefficient of thermal expansion, for example an austenitic steel. The difference in the coefficient of thermal expansions is desired to be for example at least one order of magnitude.

It is a preferred measure when the housing is designed as a cylinder, and the movable wall is designed as a piston being guided by the housing, wherein the wall is preferably spring-loaded with respect to the radial direction. Due to the difference in the thermal expansion of the cylindrical housing and the piston, the piston is easily movable with respect to the housing at the second temperature, where otherwise the housing clamps the piston at the first temperature. The spring-loading of the movable wall or the piston, respectively, is preferred so that the wall/piston always engages with the canister.

For all the embodiments it is preferred that the passive actuator has three or four passive actuator elements. Preferably, the passive actuator elements are equidistantly distributed around the outer circumference of the column pipe.

Furthermore, in accordance with the invention a vertical pump for conveying a fluid is proposed, having column inlet for the fluid at a lower end, a pump outlet for the fluid at an upper end and a column pipe arranged between the column inlet and the pump outlet, wherein the vertical pump is designed for being received in a canister surrounding the column pipe, and wherein at least one passive actuator is provided being designed according to the invention.

As already explained in connection with the passive actuator, a vertical pump provided with a passive actuator according to the invention renders it possible to easily suppress critical structural natural frequencies of the pump by shifting these critical frequencies to higher values.

Furthermore, in accordance with the invention a method of retrofitting a vertical pump is proposed, the pump having a column inlet for a fluid at a lower end, a pump outlet for the fluid at an upper end and a column pipe arranged between the column inlet and the pump outlet, wherein the vertical pump is designed for being received in a canister surrounding the column pipe, said method comprising the steps of:

providing a passive actuator for suppressing a vibration of the column pipe of the vertical pump, said passive actuator being designed in accordance with the invention, selecting at least one location at the column pipe, mounting the passive actuator at the selected location.

The passive actuator according to the invention is particularly suited for retrofitting already existing vertical pumps. If there is a resonance issue at a specific vertical pump, e.g. because a structural natural frequency of the pump installation is equal or very close to the running speed of the pump, the method according to the invention provides an efficient, very simple and cost-efficient solution for suppressing vibrations caused by said natural frequency. Thus, there is no need for a complete redesign of the pump. The resonance issue may be solved by providing at least one passive actuator to the column pipe of the pump.

Of course, it is also possible that the method for retrofitting a vertical pump comprises the step of providing a plurality of passive actuators along the column pipe.

Further advantageous measures and embodiments of the invention will become apparent from the dependent claims.

BRIEF DESCRIPTION OF THE DRAWINGS

The invention will be explained in more detail hereinafter with reference to the drawings.

DETAILED DESCRIPTION OF THE EMBODIMENTS

Figure 1:
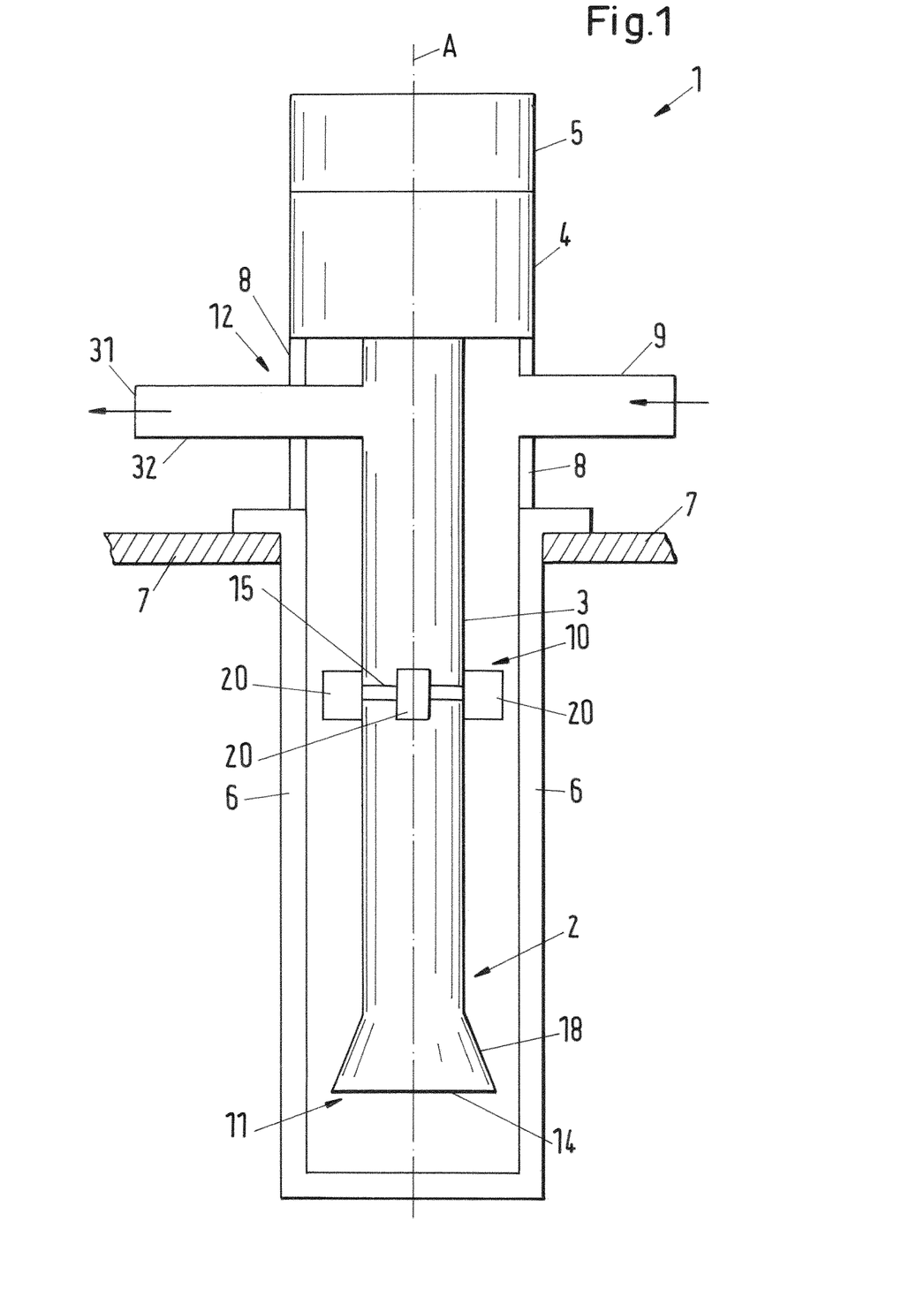
FIG. 1 is a schematic representation of an embodiment of a vertical pump according to the invention.

FIG. 1 shows a schematic representation of an embodiment of a vertical pump according to the invention which is designated in its entirety with reference numeral 1. The basic structure of the vertical pump 1 as such is known from the prior art. However the general description given with reference to FIG. 1 is also valid for an embodiment of a vertical pump 1 according to the invention.

FIG. 1 shows the vertical pump 1 in its usual operating position, i.e. in a vertical orientation. Hereinafter relative terms regarding the location like "above" or "below" or "upper" or "lower" refer to this operating position shown in FIG. 1.

The vertical pump 1 (FIG. 1) has a lower end 11, an upper end 12 and a column pipe 3 arranged between the lower end 11 and the upper end 12. The vertical pump 1 comprises a pumping unit 2 located at the lower end 11 of the pump 1. The pumping unit 2 includes a suction bell 18 having an column inlet 14 for a fluid to be pumped and at least one impeller 19 (see FIG. 2, not shown in FIG. 1), but quite often a plurality of impellers 19 for conveying the fluid from the column inlet 14 to an outlet 31 at the upper end 12 of the pump. The impellers 19 are mounted in series on a pump shaft (not shown) in a torque-proof manner. The pump shaft for rotating the impeller(s) 19 is sometimes also referred to as line shaft.

From the upper end 12 of the pumping unit 2 the tubular column pipe 3 extends vertically upwards to connect the pumping unit 2 to a bearing unit 4 for supporting the pump shaft that extends vertically within the column pipe 3. The column pipe 3 is in fluid communication with a discharge pipe 32 arranged at the upper end 12 and connects the column pipe 3 with the pump outlet 31 for discharging the pumped fluid. The column pipe 3 extends in an axial direction A that is defined by the rotational axis of the pump 1 about which the impeller(s) 19 is/are rotating during operation. The axial direction A coincides with the vertical direction, i.e. with the direction of gravity, when the pump 1 is in its usual operating position. A direction perpendicular to the axial direction A is referred to as radial direction.

On top of the bearing unit 4 a drive unit 5 is arranged for driving the impeller(s) 19 of the pump 1. The drive unit 5 may be for example an electric motor or any other driver. The drive unit 5 is operatively connected to the impeller 19 by the pump shaft or the line shaft extending in the center of the column pipe 3 and coaxially therewith. The pump shaft is supported by the bearing unit 4 and a plurality of shaft bearings arranged within the column pipe 3 at different heights for guiding the pump shaft along its entire axial length.

The vertical pump 1 is arranged in a canister 6 surrounding the column pipe 3. The canister 6 is of essentially cylindrical shape and extends in the axial direction A to receive the column pipe 3 and the pumping unit 2 of the vertical pump 1. At its upper end, the canister 6 is supported by a foundation 7 and may be fixed to the foundation 7 by screws or bolts (not shown) or any other appropriate means.

The vertical pump further comprises a support structure 8 arranged below the bearing unit 4 and supporting the entire vertical pump 1. As shown in FIG. 1 the support structure 8 may rest on the canister 6 or may be mounted to the canister 6. Alternatively or additionally the support structure 8 may also be directly connected to or supported by the foundation 7. The column pipe 3 and the pump unit 2 are usually freely hanging, i.e. without additional support, into the canister 6.

Approximately at the same height with respect to the axial direction A where the discharge pipe 32 is arranged an inlet pipe 9 is provided through which the fluid to be pumped can enter the canister 6 as indicated by the arrow without reference numeral on the right side of FIG. 1. During operation of the pump 1 the canister 6 is completely filled with the fluid to be pumped. The fluid enters the canister 6 through the inlet pipe 9, is sucked through the column inlet 14 of the pump 1 by the action of the rotating impeller(s) 19 and discharged through the discharge pipe 32 as indicated by the arrow without reference numeral on the left side of FIG. 1.

The difference in height (with respect to the axial direction A) between the column inlet 14 of the pump 1 is arranged and the upper end 12 where the inlet pipe 9 for the fluid is arranged increases the suction pressure at the column inlet 14 of the pump 1, thus also increasing the available net positive suction head (NPSH).

According to the invention a passive actuator 10 is disposed between the column pipe 3 and the canister 6 for suppressing vibration of the column pipe 3.

Figure 2:
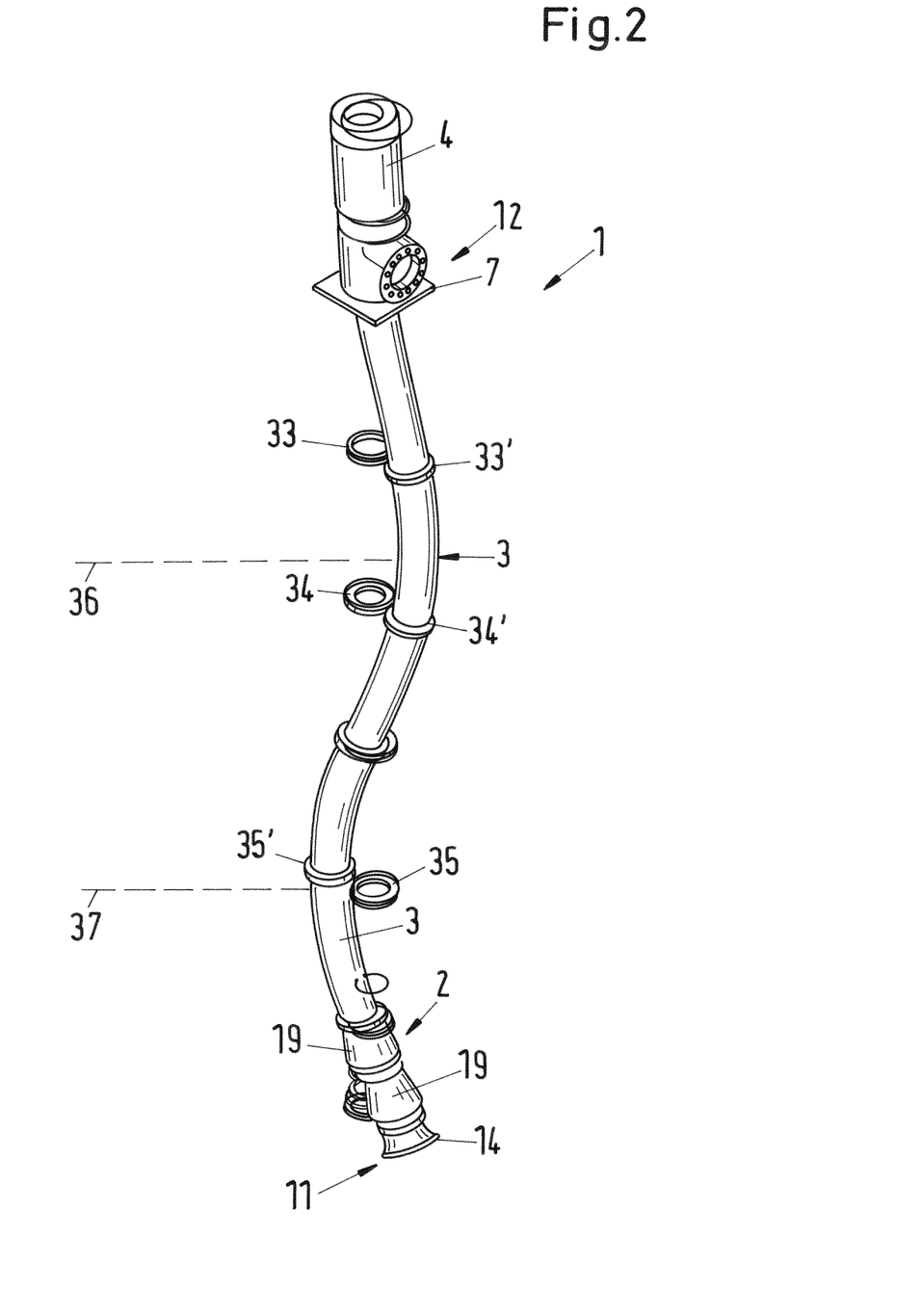
FIG. 2 shows a mechanical vibration mode shape of a vertical pump column pipe, which can also be approximated as operational vibration due to an excitation of a natural frequency.

By way of example, FIG. 2 shows a vibration mode of the column pipe 3 that is due to an excitation of a specific natural frequency. If the rotational speed of the drive unit 5 corresponds to a frequency which is equal or close to this structural natural frequency of the system, the corresponding mode is excited, resulting in strong vibrations. Since the column pipe 3 is essentially only supported by the foundation 7 but otherwise freely hanging in the canister 6 the column pipe 3 and the pump unit 2 attached to it can experience such oscillations as shown in FIG. 2. These resonant effects may have detrimental impacts on the pump 1. In particular, a premature failure of the bearings like the shaft bearings may be caused by resonance.

In FIG. 2 the locations denoted with reference numerals 33, 34, 35 represent the location of the column pipe 3 when the pump 1 is not in operation and there is no vibration, while the locations denoted with reference numerals 33', 34', 35' represent the column pipe 3 in a vibration mode when the corresponding structural natural frequency (eigenfrequency) of the vibratory system is excited, for example by the rotational frequency of the drive unit 5.

In order to resolve these resonant vibrations, the present invention proposes the passive actuator 10 for suppressing such vibrations or in other words for shifting the structural natural frequency of the vibratory system to such high frequencies which are far away e. g. from the rotational frequency of the drive unit 5.

Preferably the passive actuator 10 is located at or near such a height between the column inlet 14 and the pump outlet 31 where the antinode of the vibration mode to be suppressed is located. It goes without saying that more than one passive actuator 10 may be arranged between the column pipe 3 and the canister 6, wherein the passive actuators 10 are located at different heights. For suppressing the vibration mode illustrated in FIG. 2, for example a first passive actuator 10 may be located at a height indicated by the level 36 and a second passive actuator 10 may be located at a height indicated by level 37 in FIG. 2. Of course it is also possible to locate individual passive actuators 10 at such heights that they suppress vibration modes belonging to different structural natural frequencies of the vibratory system. For example, level 37 may be a good location for the passive actuator 10 as it is near the antinodes for the first three lateral column modes.

Figure 3:
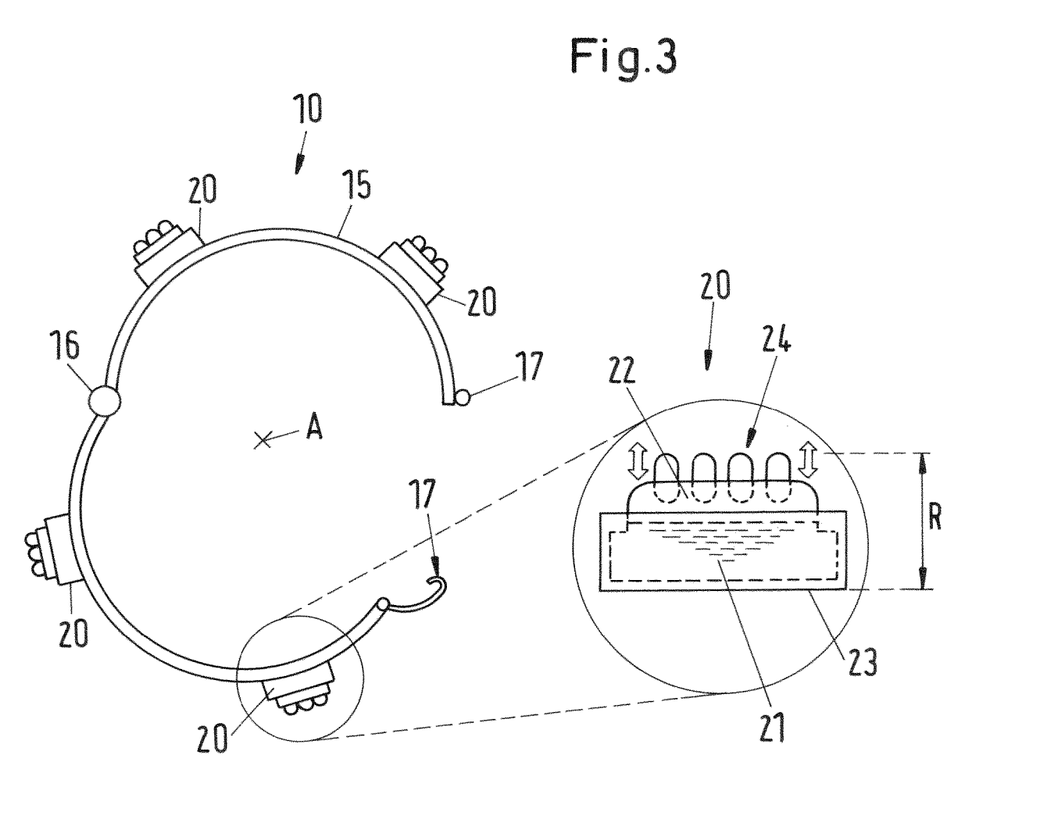
FIG. 3 is a plan view of an embodiment of a passive actuator according to the invention, together with an enlarged cross-sectional view of a first embodiment of a passive actuator element in accordance with the invention.

FIG. 3 shows a plan view of an embodiment of a passive actuator 10 according to the invention. The basic design of the passive actuator 10 is such that the passive actuator has two different operational states, namely a first operational state for adding stiffness between the canister 6 and the column pipe 3 and a second operational state, in which the added stiffness is at least considerably reduced or even reduced to zero. In the first operational state the passive actuator 10 constitutes a stiff or rigid connection between the canister 6 on the one side and the column pipe 3 on the other side. Thus, in the first operational state the passive actuator 10 clamps the column pipe 3 therewith suppressing or at least dampening the vibration of the column pipe 3. In the second operational state this clamping action is released at least to such an extent that the pump 1 with the column pipe 3 may be removed from the canister 6.

The passive actuator 10 comprises a plurality, here four, passive actuator elements 20, each of which is designed to automatically change from the second operational state to the first operational state when the temperature of the passive actuator element 20 changes from a second temperature to a first temperature, the first and the second temperature being different. In addition, each passive actuator element 20 automatically changes from the first operational state to the second operational state when the temperature of the passive actuator element 20 changes from the first temperature to the second temperature.

FIG. 3 additionally shows an enlarged cross-sectional view of one of the passive actuator elements 20 that is designed according to a first embodiment of the passive actuator element 20.

As shown in FIG. 3 the four passive actuator elements 20 are fixed to a holding device 15 which is configured to be mounted around the column pipe 3. The holding device 15 is designed as an essentially ring shaped band, wherein the inner diameter of the ring-shaped band is such that the holding device 15 closely fits around the column pipe 3. The holding device 15 comprises a hinge 16 and a closing means (or element) 17, for example a clasp or a flange, or a screw connection, so that the holding device 15 may be easily mounted to or removed from the column pipe 3. Due to the hinge 16 the holding device 15 can be opened and arranged around the column pipe 3. Then the closing element 17 is closed whereby the holding device 15 is firmly fixed to the column pipe 3. For removing the holding device 15 from the column pipe 3 the closing means 17 is opened and due to the hinge 16 the holding device 15 can be easily removed.

Preferably, the passive actuator elements 20 are equidistantly arranged on the holding device 15, such that the passive actuator elements 20 are equidistantly located about the circumference of the column pipe 3 when the holding device 15 is mounted to the column pipe 3, such that the passive actuator 10, restrains the column pipe 3 equally in all radial directions.

According to a mode for designing the passive actuator elements 20 the radial dimension R of the passive actuator element 20 changes when the passive actuator element 20 changes from the first operational state to the second operational state and vice versa. The radial dimension R of the passive actuator element 20 is its extension in the radial direction. The radial direction is perpendicular to the axial direction A in the mounted state of the passive actuator 10. The radial dimension R of the passive actuator element 20 is different in the first operational state and in the second operational state. In such embodiments the temperature change from the second to the first temperature causes an expansion of the passive actuator element 20 with respect to the radial direction. In the first operational state the passive actuator element 20 has a larger dimension in the radial direction and constitutes a stiff or rigid connection between the canister 6 and the column pipe 3. In the second operational state the passive actuator element 20 has a smaller dimension in the radial direction so that the added stiffness on the column pipe 3 is at least considerably reduced. It is also possible that one or more of the passive actuator elements 20 completely loses or lose contact with the canister 6 in the second operational state.

As shown in the enlarged cross-sectional view of FIG. 3 the passive actuator element 20 comprises a liquid tight-chamber 21 that is extendable in the radial direction. The chamber 21 is delimited by a rigid metallic housing 23 which is for example made of a steel and by a movable wall 22 that is movable with respect to the housing 23 in the radial direction as indicated by the double arrows in the enlarged view in FIG. 3. The chamber 21 is completely filled with water or with a water containing mixture, e.g. water and glycol. The medium water or the water containing mixture is liquid at the second temperature and solid at the first temperature. That is, the medium is chosen such that its phase transition from the liquid to the solid state takes place at a temperature which is between the first temperature and the second temperature. Since water or a water containing mixture expands upon freezing and the housing 23 is rigid, the movable wall 22 is moved in the radial direction when the medium in the chamber 21 freezes thus increasing the radial dimension R of the passive actuator element 20.

Thus, in the first embodiment of the passive actuator element 20 the expansion of water during its phase transition from the liquid to the solid state is used to increase the radial dimension R of the passive actuator element 20 when the temperature changes from the second temperature to the first temperature. And conversely, when the temperature changes from the first to the second temperature the water or the water containing mixture in the chamber 21 melts and the radial dimension of the passive actuator element 20 decreases.

Most preferred, the temperature of the passive actuator element is changed by the fluid in the canister 6 that is pumped by the vertical pump 1. The first embodiment of the passive actuator element 20 is therefore particularly suited for low temperature applications in which the fluid to be pumped is at a temperature well below zero degrees Celsius, for example for pumping LNG or other liquid volatile compounds. The second temperature corresponds essentially to the ambient temperature at the operation site where the vertical pump 1 is installed, e.g. 20° C. When the pump 1 is not in operation the canister 6 is not filled with the cold fluid meaning that the passive actuator element 20 has the second temperature and is in its second operational state, i.e. in the contracted state with the smaller radial dimension R. In this state the passive actuator 10 may be easily installed and located around the column pipe 3 and the pump 1 may be easily inserted into the canister 6. When the pump 1 starts to operate the cold process fluid fills the canister 6 and cools the passive actuator elements 20 to the first temperature. The liquid in the chamber 21 freezes, the ice expands and therewith the passive actuator element 20 changes into its first operational state. In the case of water the volumetric change upon freezing is approximately 10% but this can be mechanically converted to a greater linear expansion. The passive actuator element 20 then engages with the canister 6 and constitutes a stiff connection between the canister 6 and the column pipe 3. In their entirety all passive actuator elements 20 provide a stiff brace clamping the column pipe 3 and thus suppressing vibrations of the column pipe 3.

When the vertical pump 1 is stopped and the cold process fluid is removed the passive actuator elements 20 will heat up towards ambient temperature and therewith change from the first operational state to the second operational state. The medium in the chamber 21 melts and it is easily possible to remove the pump 1 from the canister 6.

As it is shown in FIG. 3 all passive actuator elements 20 are arranged such that the movable wall 22 faces the canister 6. The bottom of the housing 23 opposing the movable wall 22 is fixed to the holding device 15, for example by welding or any other suited means.

In addition, it may be advantageous to provide the movable wall 22 with one or more rolling elements 24 which contact the canister 6 at least when the passive actuator element 20 is in its first operational state. The rolling elements 24 allow for a movement in axial direction A which can occur by the axial thermal expansion of the column pipe 3. It is also possible to design the passive actuator element 20 such that they contact the canister 6 both in the first and in the second operational state For most applications it is sufficient to provide at most two passive actuators 10 each having three or four passive actuator elements 20. The two passive actuators 10 are located at different heights of the column pipe 3. By this measure all structural natural frequencies may be increased to such an extent that they are considerably higher than the excitation frequencies occurring in the operating speed range of the vertical pump 1.

Figure 4:
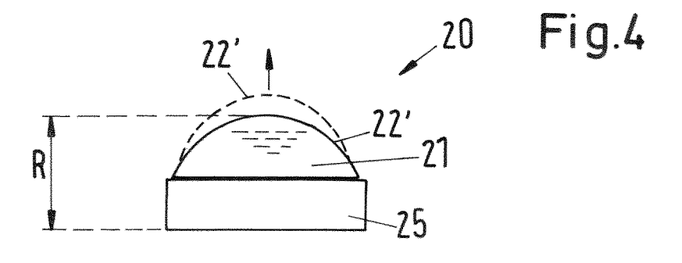
FIG. 4 is a cross-sectional view of a variant of the first embodiment of the passive actuator element shown in FIG. 3.

FIG. 4 shows a cross-sectional view of a first variant of the first embodiment of the passive actuator element 20 that uses the expansion of water upon freezing for changing between the first and the second operational state of the passive actuator element 20.

According to this first variant the movable wall 22 is replaced with a fully flexible wall 22' delimiting the chamber 21 and designed to allow for an expansion of the chamber 21 with respect to the radial direction. The chamber 21 with the water or the water containing mixture is made of a flexible or elastic material for example a polymer. The polymer may be e.g. a nitrile rubber like the one that is available under the tradename Buna-N. The chamber 21 is for example designed as a diaphragm or a balloon containing the water or the water containing mixture as medium.

The passive actuator element 20 further comprises a rigid base part 25 that is made for example of a metal like steel. The flexible chamber 21 is fixed to the base part 25 for example by gluing or a suited adhesive such that the base part 25 supports the chamber 21 on one side. The opposing side of the chamber 21 constitutes the flexible wall 22', which faces away from the base part 25 and which faces the canister 6 in the mounted state. The base part 25 may be mounted to the holding device 15 or directly to the column pipe 3 e.g. by welding or screwing.

When the passive actuator element 20 is in its second operational state at the second temperature the medium in the chamber 21 is in its liquid phase. This state is indicated by the solid line in FIG. 4. When the temperature of the passive actuator element 20 changes to the first operational state in which the passive actuator element 20 has the lower, first temperature the medium in the flexible chamber 21 freezes and increases its volume, thereby increasing the radial dimension R of the passive actuator element 20 and moving the flexible wall 22' towards the canister 6 in order to firmly engage the wall of the canister 6. This movement of the flexible wall 22' is indicated by the arrow without reference numeral in FIG. 4. The dashed line in FIG. 4 indicates the location of the flexible wall 22' when the passive actuator element 20 is in its first operational state in which it constitutes a rigid connection between the column pipe 3 and the canister 6. If the temperature of the passive actuator element 20 changes from the first to the second temperature the medium in the chamber 21 melts thus releasing the bracing force between the column pipe 3 and the canister 6. In the second operational state of the passive actuator element 20 the vertical pump 1 with the column pipe 3 can be easily removed from the canister 6.

Figure 5:
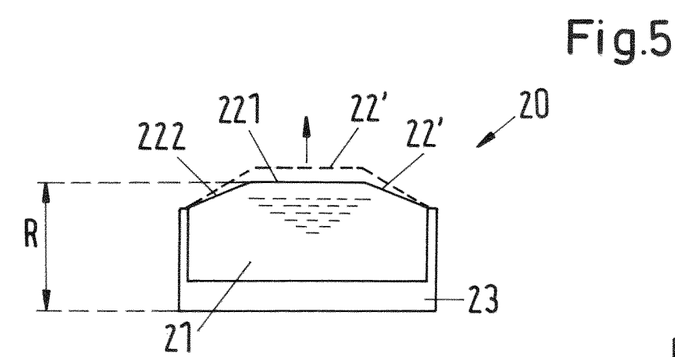
FIG. 5 is a cross-sectional view of a second variant of the first embodiment of the passive actuator element shown in FIG. 3.

FIG. 5 shows a cross-sectional view of a second variant of the first embodiment of the passive actuator element 20 that uses the expansion of water upon freezing for changing between the first and the second operational state of the passive actuator element 20. In addition, FIG. 6 shows a top view on the second variant as seen from the canister 6.

Similar to the first embodiment shown in FIG. 3 the second variant comprises a rigid housing 23 which is made for example of a metal such as a steel. The housing 23 has a generally cylindrical shape with the top side—according to the representation in FIG. 5—being open. The top side is closed by the flexible wall 22' which is connected to the housing 23 in a liquid-tight manner. Thus, the chamber 21, containing the water or the water containing mixture as medium is delimited and closed by the cylindrical housing 23 and the flexible wall 22'. In the mounted state the flexible wall 22' faces the canister 6.

In this variant the flexible wall 22' is designed as a partially flexible wall 22', namely a hybrid wall consisting partially of a metal, e.g. a steel, and partially of a flexible or elastic material for example a polymer. The polymer may be e.g. a nitrile rubber like the one that is available under the tradename Buna-N.

Figure 6:
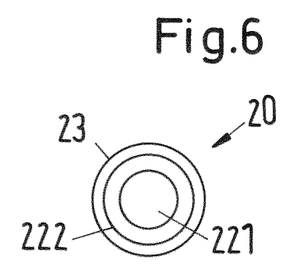
FIG. 6 is a top view of the variant shown in FIG. 5.

As can be best seen in FIG. 6 the flexible wall 22' comprises a central disc-shaped and rigid metal piece 221 being arranged concentrically with respect to the cylindrical housing 23 and a ring-shaped flexible piece 222 surrounding the metal piece 221 and connecting the metal piece 221 to the housing 23 in a liquid-tight manner. The ring-shaped flexible piece 222 provides for the flexibility of the wall 22' so that the radial dimension R of the passive actuator element 20 can increase when the passive actuator element 20 changes from the second to the first operational state and decrease when the passive actuator element 20 changes from the first to the second operational state.

In FIG. 5 the solid line represents the flexible wall 22' when the passive actuator element is in its second operational state, i.e. the water or the water containing mixture in the chamber 21 is liquid. The arrow without reference numeral indicates the movement of the flexible wall 22' upon freezing of the liquid in the chamber 21 and the dashed line indicates the location of the flexible wall 22' when the passive actuator element 20 is in its first operational state.

The hybrid design of the flexible wall 22' allows a very simple and precise adjustment of the difference in the radial dimension of the passive actuator element 20 in the first and in the second operational state.

As already explained in connection with FIG. 3 the metal piece 221 may include roller elements 24 (not shown in FIG. 5) to allow for a relative movement between the passive actuator element 20 and the canister 6 in the axial direction A.

Figure 7:
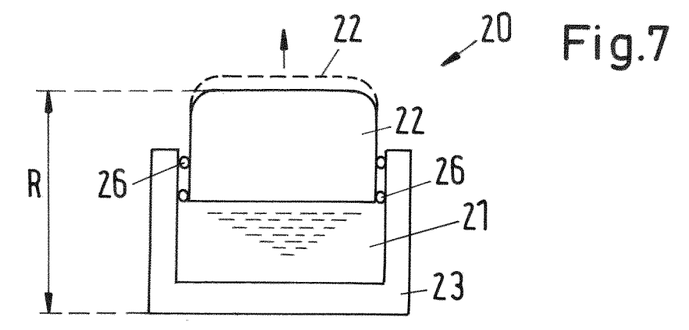
FIG. 7 is a cross-sectional view of third variant of the first embodiment of the passive actuator element shown in FIG. 3.

FIG. 7 shows a cross-sectional view of a third variant of the first embodiment of the passive actuator element 20 that uses the expansion of water upon freezing for changing between the first and the second operational state of the passive actuator element 20.

According to the third variant the movable wall 22 is designed as a piston that is guided by the cylindrical housing 23 of the passive actuator element 20, i.e. the chamber 21 containing the water or the water containing mixture as a medium is delimited by the cylindrical housing 23 and the piston 22. Upon freezing of the liquid in the chamber 21 the piston 22 is extended towards the canister 6 as indicated by the arrow without reference numeral in FIG. 7, so that the passive actuator element 20 constitutes a rigid connection between the column pipe 3 and the canister when the passive actuator element 20 is in the first operational state.

In FIG. 7 the solid line represents the piston 22 when the passive actuator element is in its second operational state, i.e. the water or the water containing mixture in the chamber 21 is liquid and the dashed line indicates the location of the piston when the passive actuator element 20 is in its first operational state. In order to seal the chamber 21 in a liquid-tight manner one or more sealing elements 26, for example O-rings, may be disposed between the piston 22 and the part of the housing 23 that guides the piston 22.

Figure 8:
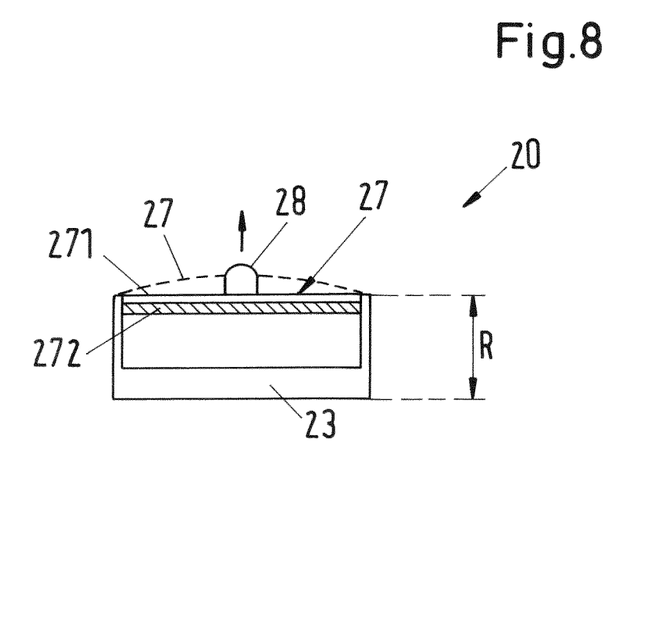
FIG. 8 is a cross-sectional view of a second embodiment of a passive actuator element in accordance with the invention.

FIG. 8 shows a cross-sectional view of a second embodiment of the passive actuator element 20. In the following description only the differences to the first embodiment are explained. The explanations with respect to the first embodiment are also valid in analogously the same way for the second embodiment shown in FIG. 8. The second embodiment of the passive actuator element 20 does not require a freezing liquid for changing the radial dimension R of the passive actuator element 20 when it changes between its first and second operational state.

According to the second embodiment each passive actuator element 20 comprises a metallic expander 27 for changing the radial dimension R of the passive actuator element when it changes between the first and the second operational state. Instead of a volume change of a liquid upon freezing, in the second embodiment the thermal expansion of metals or a temperature induced phase transition of a metallic material is used for changing the radial dimension R of the passive actuator element.

As can be seen in FIG. 8 the passive actuator element 20 comprises a rigid housing 23 which is made for example of a metal such as a steel. The housing 23 has a generally cylindrical shape with the top side—according to the representation in FIG. 8—being open, wherein this top side faces the canister 6 in the mounted state of the passive actuator 10. The top side of the housing 23 is closed by the metallic expander 27 that is designed as a flat disc-shaped bimetallic plate being firmly connected to the cylindrical wall of the housing 23 for example by welding or any other suited means.

As it is known for bimetallic members the metallic expander 27 comprises two different metallic layers 271 and 272 which are made of two metallic materials having different coefficients of thermal expansion. For example, one of the layers 271, 272 may be made of copper and the other one of steel. However, there are a lot of different material pairings which are known in the art to form a bimetallic plate. The first layer 271 and the second layer 272 are firmly bonded to each other over their entire surface. Upon a change in temperature the two layers 271 and 272, respectively, extend or contract to a different extent, which results in a bending of the metallic expander 27 and therewith a change of the radial dimension R of the passive actuator element 20.

Preferably the metallic expander 27 is designed such that it is flat, i.e. not domed, when the passive actuator element 20 is at the second temperature and in its second operational state.

Also regarding the second embodiment, it is preferred when the temperature change is achieved by way of the fluid that is pumped by the vertical pump 1. When the pump 1 is not in operation and the canister 6 is not filled with the fluid to be pumped each passive actuator element 20 adopts the temperature in the canister 6, which should be close to ambient temperature. This ambient temperature constitutes the second temperature. When the vertical pump 1 is in operation and the canister 6 is filled with the fluid to be pumped each passive actuator element 20 adopts a different temperature which is given by the temperature of the fluid to be pumped. This temperature constitutes the first temperature. Thus, in low temperature applications, for example when pumping LNG, the first temperature is considerably lower than the second temperature and in high temperature applications, for example when pumping molten salt, the first temperature is considerably higher than the second temperature.

The second embodiment shown in FIG. 8 is particularly suited both for low and high temperature applications. For high temperature applications the second layer 272, i.e. the lower one according to the representation in FIG. 8, is made of the material having the lower coefficient of thermal expansion. Thus, if the temperature of the passive actuator element 20 changes from the second temperature (pump 1 not operating) to the considerably higher first temperature the metallic expander 27 forms a dome as indicated by the arrow without reference numeral and the dashed line in FIG. 8. Thereby the radial dimension R of the passive actuator element 20 is greater in the first operational state at the first temperature than in the second operational state at the second temperature. Consequently, each passive actuator element 20 constitutes a rigid connection between the canister 6 and the column pipe 3 resulting in the desired clamping action for damping or suppressing a vibration of the column pipe 3.

When basically the same design is used for low temperature applications, i.e. the first temperature is considerably lower than the second temperature, the second layer 272 is made of the material having the higher coefficient of thermal expansion. As a result the metallic expander 27 forms a dome as indicated by the arrow without reference numeral and the dashed line in FIG. 8 during the change from the second to the first temperature. Thereby the radial dimension R of the passive actuator element 20 is greater in the first operational state at the first temperature than in the second operational state at the second temperature.

It goes without saying that for the design of the metallic expander 27 also other geometries or arrangements of bimetallic elements are possible. In the second embodiment the chamber delimited by the housing 23 and the metallic expander 27 does not need to be water tight. In addition, the housing 23 does not need to be more than just a support at the perimeter of the disc-shaped metallic expander 27, or point supports on either side of a strip, if the metallic expander 27 is designed as a strip.

Preferably, the metallic expander 27 comprises in its center a contact pin 28 protruding in the radial direction for engaging the canister 6 when the passive actuator element is in its first operational state. The contact pin 28 may be made of a metal or a polymer. In addition, the contact pin 28 may also be designed as a rolling element similar to the rolling elements 24 shown in FIG. 3 to allow for a relative movement between the passive actuator element 20 and the canister 6 with respect to the axial direction A. Furthermore, it is also possible to provide additional rolling elements 24 (FIG. 3) on the metallic expander 27 for contacting the canister 6 when the passive actuator element is in its first operational state.

As an alternative to the bimetallic plate or disc it is also possible to design the metallic expander 27 with a shape memory alloy (SMA) having its structural phase transition from the high temperature phase to the low temperature phase at a temperature that is located between the first and the second temperature. Since the temperature induced and reversible phase transition of a SMA results in a deformation of the SMA, the SMA can be used to change the radial dimension R of the passive actuator element 20 upon a change from the first to the second temperature and vice versa.

Figure 9:
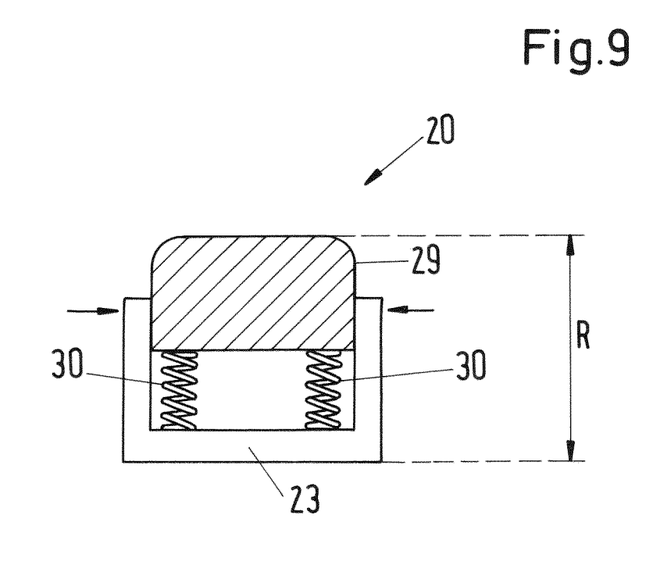
FIG. 9 is a cross-sectional view of a third embodiment of a passive actuator element in accordance with the invention.

FIG. 9 shows a cross-sectional view of a third embodiment of the passive actuator element 20. In the following description only the differences to the first and the second embodiment are explained. The explanations with respect to the first and the second embodiment are also valid in analogously the same way for the third embodiment shown in FIG. 9.

According to the third embodiment each passive actuator 20 has a different stiffness with respect to the radial direction in the first and the second operational state, respectively. Each passive actuator element 20 has a high stiffness with respect to the radial direction in the first operational state, the high stiffness preventing a compression of the passive actuator element 20 with respect to the radial direction, and each passive actuator element 20 has a low stiffness with respect to the radial direction in the second operational state, the low stiffness allowing an elastic compression of the passive actuator element 20 with respect to the radial direction.

The passive actuator element 20 comprises a housing 23 and a movable wall that is preferably designed as a piston 29 being guided by the housing 23, so that the piston 29 is movable relative to the housing 23 in the radial direction. The housing 23 is designed as a cylinder for guiding the piston 29. The housing 23 and the piston 29 are made of different materials, having different coefficients of thermal expansion, such that the housing 23 clamps around the piston 29 in the first operational state, and that the piston 29 is movable relative to the housing 23 in the second operational state.

By way of example reference is made to a low temperature application of the vertical pump 1, where the second temperature (the pump 1 is not in operation, the canister 6 is not filled with the fluid to be pumped) is higher than the first temperature (the pump 1 is in operation, the canister 6 is filled with the fluid to be pumped). For this case the piston 29 is made of a material that has a very low or even negligible coefficient of thermal expansion and the housing 23 is made of a material having a considerably higher coefficient of thermal expansion. The two coefficients of thermal expansion may for example differ by at least an order of magnitude. An example of a material having a very low coefficient of thermal expansion is one of the iron nickel alloys, which is commercially available under the tradename Invar. An example for a material having a considerably higher coefficient of thermal expansion is austenitic steel, having a coefficient of thermal expansion that is about 20 times larger than that of Invar.

Thus, the piston 29 is for example made of Invar and the housing 23 is made of austenitic steel.

The piston 29 and the housing 23 are designed and dimensioned such that the piston 29 is easily movable relative to the housing 23 in the radial direction when the passive actuator element 20 is at the second temperature.

In addition, the piston 29 is spring-loaded with respect to the radial direction by two or more soft springs 30 arranged between the piston 29 and the bottom of the cylindrical housing 23. When the passive actuator element 20 is at the second temperature, it is easily compressible with respect to the radial direction by pushing the piston 29 inside the housing 23 against the spring force of the soft springs 30. The spring 30 shall exert a large enough force to extend the piston 29 so that it engages with the canister wall, and should stay engaged at all times, in both operational states, albeit with different stiffnesses. This corresponds to the second operational state of the passive actuator element 20. Thus, in this second operational state the column pipe 3 with the passive actuator 10 mounted to it may be easily inserted into or removed from the canister 6, since the passive actuator elements 20 are easily compressible against the light load of the springs 30. During insertion (or removal) of the column pipe 3 into (or from) the canister 6 the piston 29 follows the surface of the canister 6 without deflecting the column pipe 3. It is also possible to provide the topside of the piston 29 facing the canister 6 with rolling elements 24 in an analogous manners as it is explained in connection with FIG. 3.

When the vertical pump 1 starts operating, the temperature of each passive actuator element 20 changes from the second temperature down to the first temperature. Due to its higher coefficient of thermal expansion the cylindrical housing 23 contracts to a greater degree than the piston 29. At a given design temperature between the second and the first temperature the housing 23 clamps the piston 29 for example by an interference fit. As a result the piston 29 is locked in its actual position with respect to the housing 29 and is no longer movable in the radial direction, meaning that the passive actuator element 20 has now a considerably higher stiffness with respect to the radial direction preventing a compression of the passive actuator element 20, with radial forces in radial direction being transmitted through the housing 23 instead of the soft springs 30.

The stronger contraction of the cylindrical housing 23 is indicated in FIG. 9 by the two arrows without reference numeral.

The desired design temperature (whereby clamping occurs) located between the first and the second temperature may be adjusted for example by the dimensions of the piston 29 and the housing 23 and by their thermal expansion. When passing the design temperature and decreasing further to the first temperature, the force that the housing 23 exerts on the piston 29 increases. In addition, the entire system of the canister 6, the column pipe 3 and the passive actuator 10, all having non-zero coefficients of thermal expansion, contracts radially. Only the pistons 29 do not contract or at least to a considerably lower extent. This corresponds to a relative expansion of the pistons 29 with respect to the rest of the system that increases both the bracing force acting between the column pipe 3 and the canister wall and the clamping force between the housing 23 and the piston 29.

At the first temperature each passive actuator element 20 is in its first operational state and constitutes a very stiff connection between the canister 6 and the column pipe 3 resulting in the desired bracing action for suppressing vibration of the column pipe 3.

Also, the third embodiment of the passive actuator element 20 may be designed for high temperature applications where the second temperature is considerably lower than the first temperature. For such high temperature applications the piston 29 is made of the material having the higher coefficient of thermal expansion, e.g. austenitic steel, whereas the housing 23 is made of the material having the lower coefficient of thermal expansion, e.g. Invar. When heating, the passive actuator element 20 from the second to the first temperature the piston 29 expands to a large diameter than the corresponding hole in the housing 23, so that the piston 29 is clamped in the housing 23 when passing a design temperature between the second and the first temperature and fixed in its radial position.

Referring now to all described embodiments and variants of the passive actuator 10 or the passive actuator element 20, respectively, it is also possible to directly fix the individual passive actuator elements 20 at an appropriate location to the column pipe 3, for example by welding. Thus, it is not necessary that the passive actuator 10 comprises a common holding device 15 to which the passive actuator elements 20 are fixed.

It is also possible to fix the passive actuator 10 or the passive actuator elements 20, respectively, to the canister 6. In this case each passive actuator element 20 is arranged such that the movable wall 22, or the piston 22, or the flexible wall 22', or the piston 29, or the metallic expander 27, respectively, faces the column pipe 3.

For most applications it is preferred that the passive actuator 10 has three or four passive actuator elements 20 that are all arranged at the same height between the lower end 11 and the upper end 12 of the pump and equidistantly distributed along the circumference of the column pipe 3 at said height.

In addition, for most applications it is sufficient to provide at most two passive actuators 10 at different heights of the column pipe 3 in order to shift all structural natural frequencies of the vibratory system to higher frequencies than the frequencies at which the vertical pump 1 is operated.

Although it is preferred that the change between the second and the first temperature is achieved by the process fluid to be pumped, it is also possible to provide heating or cooling means for changing the temperature of the passive actuator elements 20 between the second and the first temperature.

In many applications it is not needed or even not desired that the column pipe 3 of the vertical pump 1 is centered with respect to the canister 6 in the mounted state, i.e. the distance in radial direction between the column pipe 3 and the canister 6 varies along the circumference of the column pipe 3 and/or along the height of the column pipe 3 in axial direction A. In such applications it is not desired that the passive actuator 10 exerts a centering force on the column pipe 3 because such additional centering forces could result in additional loads acting on parts of the pump 1, for example on the bearings.

One possible measure to account for the eccentricity of the column pipe 3 regarding the canister 6 is to design the individual passive actuator elements 20 of one passive actuator 10 with different radial dimensions R adapted to the available distance between the column pipe 3 and the canister 6 at the specific location on the column pipe 3 where the respective passive actuator element 20 is arranged.

This measure to provide passive actuator elements 20 with different radial dimensions may also be applied in applications where the tubular column pipe 3 and/or the canister 6 deviate from a circular cross-section perpendicular to the axial direction A. If the column pipe 3 has for example an elliptical cross-section perpendicular to the axial direction A it is possible to place passive actuator elements 20 with a smaller radial dimension R at those locations where the column pipe 3 comes nearer to the canister 6 and to place passive actuator elements 20 with a larger radial dimension R at those locations where the column pipe 3 is farer away from the canister 6.

Another advantageous measure to compensate deviations of the column pipe 3 from a circular cross-section is to provide resilient or compliant elements between the holding device 15 and the column pipe 3 or between the passive actuator elements 20 and the column pipe 3, for example one or more Bellville washers.

The passive actuator 10 according to the invention is especially suited for retrofitting vertical pumps 1.

According to the invention, the method of retrofitting a vertical pump 1 having a column inlet 14 for a fluid at a lower end 11, a pump outlet 31 for the fluid at an upper end 12 and a column pipe 3 arranged between the column inlet 14 and the pump outlet 31, wherein the vertical pump 1 is designed for being received in a canister 6 surrounding the column pipe 3, comprises the steps of:

providing a passive actuator 10 for suppressing a vibration of the column pipe 3 of the vertical pump 1, said passive actuator being designed in accordance with the invention, selecting at least one location at the column pipe 3, mounting the passive actuator 10 at the selected location.

Also when retrofitting existing vertical pumps 1 it is preferred that each passive actuator 10 comprises a plurality of passive actuator elements 20 and most preferred three or four passive actuator elements 20. Furthermore, it is preferred that the radial dimension R of each passive actuator element 20 is adapted to the distance in radial direction between the column pipe 3 and the canister 6. Thus, the method provides a very simple, safe and efficient solution to resolve resonance or vibration problems in vertical pumps. In particular, when designing the passive actuator elements 20 according to the third embodiment including the springs 30, the passive actuator elements 20 are self-adjusting to the available distance between the column pipe 3 and the canister 6 at their respective location.

In order to select the appropriate location or locations between the column pipe 3 and the canister 6 for mounting the passive actuator(s) 10 or the passive actuator elements 20, respectively, it is possible to use an analytical method and preferably computation modal analysis in order to see or visualize the vibration modes of the column pipe 3. The determination of the specific locations may also be based upon other methods, e.g. simulations or other analytical methods which are as such known to a person skilled in the art. Furthermore, it is possible to use empiric data, trials, historical data of vertical pumps or know-how for said determination.

The method according to the invention is suited both for resolving resonance or vibration problems in already installed and operating pumps 1 and for avoiding resonance or vibration problems in newly manufactured pumps 1. Especially in view of retrofitting existing vertical pumps 1 it is advantageous that there is no need for a complete redesign of the vertical pump 1 to overcome resonance issues. The invention provides a solution with a very simple and effective design. This method is very flexible and can be applied to all vertical pumps 1 having a column pipe 3 and being arranged in a canister 6. The installation of the passive actuators 10 is very fast and easy.

Furthermore, the installation of the passive actuator 10 may be performed on site at the location where the vertical pump 1 is operating. Since the proposed method comprises a very simple solution, it is not necessary to disassemble the entire vertical pump or to disassemble the column pipe 3 of the vertical pump 1. This drastically reduces the costs and the required time for resolving existing resonance problems in vertical pumps.

The invention claimed is:

1. A passive actuator for suppressing vibration of a column pipe of a vertical pump, the passive actuator is configured to be mounted between the column pipe of the vertical pump and a canister surrounding the column pipe, the passive actuator having a first operational state to add stiffness between the canister and the column pipe and a second operational state to at least reduce said stiffness, the passive actuator comprising:
a plurality of passive actuator elements, wherein each of the passive actuator element of the plurality of passive actuator elements is configured to automatically change from the second operational state to the first operational state when the temperature of said each of the passive actuator elements changes from a second temperature to a first temperature, the first temperature being different from the second temperature, and to automatically change from the first operational state to the second operational state, when the temperature of said each of the passive actuator elements changes from the first temperature to the second temperature.

2. The passive actuator in accordance with claim 1, wherein all of the plurality of passive actuator elements are fixed to a holding device, and the holding device is configured to be mounted around the column pipe of the vertical pump.

3. The passive actuator in accordance with claim 1, wherein said each of the passive actuator element of the plurality of passive actuator elements has a radial dimension in a radial direction, the radial direction extending perpendicular to an axial direction in a mounted state of the passive actuator, the axial direction being defined by a rotational axis of the vertical pump, and the radial dimension is different in the first operational state and in the second operational state.

4. The passive actuator in accordance with claim 3, wherein said each of the passive actuator element of the plurality of passive actuator elements comprises a liquid-tight chamber extendible in the radial direction, the chamber is filled with a medium, and the medium is liquid in the second operational state and solid in the first operational state.

5. The passive actuator in accordance with claim 4, wherein the chamber is delimited by a flexible wall configured to allow expansion of the chamber with respect to the radial direction.

6. The passive actuator in accordance with claim 5, wherein the flexible wall is at least partially made of a polymer.

7. The passive actuator in accordance with claim 4, wherein the chamber is delimited by a housing and by a movable wall, the movable wall being movable relative to the housing in the radial direction.

8. The passive actuator in accordance with claim 7, wherein the movable wall is a piston configured to be guided by the housing.

9. The passive actuator in accordance with claim 3, wherein said each of the passive actuator element of the plurality of passive actuator elements comprises a metallic expander configured and arranged such that the radial dimension of said each of the passive actuator element is different in the first operational state and in the second operational state.

10. The passive actuator in accordance with claim 1, wherein each passive actuator element of the plurality of passive actuator elements has a radial dimension in a radial direction, the radial direction extending perpendicular to an axial direction in a mounted state of the actuator, the axial direction being defined by a rotational axis of the vertical pump, said each of the passive actuator element has a high stiffness with respect to the radial direction in the first operational state, the high stiffness preventing compression thereof with respect to the radial direction, and said each of the passive actuator element has a low stiffness with respect to the radial direction in the second operational state, the low stiffness enabling an elastic compression with respect to the radial direction.

11. The passive actuator in accordance with claim 10, wherein said each of the passive actuator element comprises a housing and a movable wall, the movable wall being movable relative to the housing in the radial direction, the housing and the movable wall are made of different materials, having different coefficients of thermal expansion, such that the housing clamps the movable wall in the first operational state, and that the movable wall is movable relative to the housing in the second operational state.

12. The passive actuator in accordance with claim 11, wherein the housing is a cylinder, and the movable wall is a piston configured to be guided by the housing.

13. The passive actuator in accordance with claim 1, wherein the plurality of passive actuator elements includes three or four said passive actuator elements.

14. A vertical pump for conveying a fluid, comprising:
a column inlet for the fluid at a lower end;
a pump outlet for the fluid at an upper end;
the column pipe arranged between the column inlet and the pump outlet, the vertical pump configured to be received in a canister surrounding the column pipe; and
at least one passive actuator according to claim 1.

15. A method of retrofitting a vertical pump having a column inlet for a fluid at a lower end, a pump outlet for the fluid at an upper end and a column pipe arranged between the column inlet and the pump outlet, the vertical pump configured to be received in a canister surrounding the column pipe, the method comprising:
providing a passive actuator in accordance with claim 1 to suppress vibration of the column pipe of the vertical pump;
selecting at least one location at the column pipe; and
mounting the passive actuator at the selected location.

16. The passive actuator in accordance with claim 3, wherein each passive actuator element of the plurality of passive actuator elements comprises a liquid-tight chamber extendible in the radial direction, the chamber is filled with water or a water containing mixture, and the water is liquid in the second operational state and solid in the first operational state.

17. The passive actuator in accordance with claim 12, wherein the movable wall is spring-loaded with respect to the radial direction.

* * * * *